United States Patent Office 2,935,393
Patented May 3, 1960

2,935,393

1-(2-HYDROXYETHYL)-1-METHYL-3-PHENYLUREA

Raymond W. Luckenbaugh, Wilmington, Del., assignorto E. I. du Pont de Nemours and Company, Wilmington, Del., a corporation of Delaware No Drawing. Application April 29, 1957
Serial No. 655,530

2 Claims. (Cl. 71—2.6)

This invention relates to 1-(2-hydroxyethyl)-1-methyl-3-phenylurea.

The hydroxyethyl urea compound of this invention can be prepared by the reaction of phenylisocyanate with methylethanolamine as illustrated by the following equation:

(1)
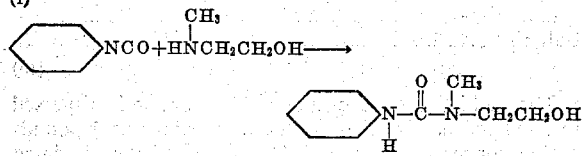

The process illustrated by this equation is suitably carried out by gradual addition of the amine reactant to an agitated solution of the phenylisocyanate in an inert liquid medium such as xylene, toluene, dioxane, and the like. Ordinarily, temperatures in the range of 0° to 100° C. are satisfactory.

I have found that 1-(2-hydroxyethyl)-1-methyl-3-phenylurea not only has the effective herbicidal properties of many of the substituted ureas previously used or suggested but additionally has the unexpected added property of acting quickly to kill even deep rooted plants. This new compound finds special utility in certain areas where other substituted urea compounds have not uniformly given outstanding results, for example, in relatively arid areas and in application to highly adsorbent soils.

Not only does 1-(2-hydroxyethyl)-1-methyl-3-phenylurea possess an outstandingly high order of herbicidal activity, but furthermore this compound has the surprising property of not persisting in the soil for too prolonged a peroid of time, thereby rendering the soil sterile for a long period after treatment. Because of this property, this compound can be used to kill the weeds in a field, and after a relatively short time the field can be used as an agricultural plot. This is to be contrasted with the customary prolonged sterility afforded by such customary substituted urea herbicides as 3-(p-chlorophenyl)-1,1-dimethylurea.

Herbicidal compositions of the invention are prepared by admixing 1-(2-hydroxyethyl)-1-methyl-3-phenylurea in herbicidally effective amounts with a conditioning agent of the kind used and referred to in the art as a pest control adjuvant or modifier to provide formulations adapted for ready and efficient application to soil or weeds (i.e., unwanted plants) using conventional applicator equipment.

Thus the herbicidal compositions or formulations are prepared in the form of solids or liquids. Solid compositions are preferably in the form of dusts and are compounded to give homogeneous free-flowing dusts by admixing 1-(2-hydroxyethyl)-1-methyl-3-phenylurea with finely divided solids, preferably talcs, natural clays, pyrophyllite, diatomaceous earth or flours such as walnut shell, wheat, redwood, soya bean, cottonseed flours and other inert solid conditioning agents or carriers of the kind conventionally employed in preparing pest control compositions in dust or powdered form.

Liquid compositions of the invention are prepared in the usual way by admixing 1-(2-hydroxyethyl)-1-methyl-3-phenylurea with a suitable liquid diluent medium. With certain solvents such as alkylated naphthalene, dimethylformamide, and cresol, relatively high, up to about 35% by weight or more, concentrations of 1-(2-hydroxyethyl)-1-methyl-3-phenylurea can be obtained in solution. Other liquids conventionally used in preparing liquid herbicidal compositions are for the most part less effective solvents.

The herbicidal compositions of the invention whether in the form of dusts or liquids preferably also include a surface-active agent of the kind sometimes referred to in the art as a wetting, dispersing or emulsifying agent. These agents which will be referred to hereinafter more simply as surface-active agents cause the compositions to be easily dispersed in water to give aqueous sprays which for the most part constitute a desirable composition for application.

The surface-active agents employed can be of the anionic, cationic or nonionic type and include, for example, sodium and potassium oleate, the amine salts of oleic acids such as morpholine and dimethylamine oleates, the sulfonated animal and vegetable oils such as sulfonated fish and castor oils, sulfonated petroleum oils, sulfonated acyclic hydrocarbons, sodium salt of lignin sulfonic acid (goulac), alkyl naphthalene sodium sulfonate and other wetting, dispersing and emulsifying agents such as those listed in articles by McCutcheon in "Soap and Chemical Specialties," volume 31, Nos. 7–10 (1955).

Generally the surface-active agent will not comprise more than about 5 to 15% by weight of the composition depending, of course, upon the particular surface-active agent, the system in which it is placed, and the result desired, and in certain compositions, the percentage will be 1% or less. Usually the minimum lower concentration will be 0.1%.

The herbicidal compositions are applied either as a spray or a dust to the locus or area to be protected from undesirable plant growth, commonly called weeds, i.e., plants growing where they are not wanted. Such application can be made directly upon the locus or area and the weeds thereon during the period of weed infestation in order to destroy the weds, but if desired the application can be made in advance of an anticipated weed infestation to prevent such infestation. Thus the compositions can be applied as aqueous foliar sprays but can also be applied as sprays directly to the surface of the soil. Alternatively, the dried powdered compositions can be dusted directly or on the plants or on the soil.

The active compound is, of course, applied in amount sufficient to exert the desired herbicidal action. The amount of the active 1-(2-hydroxyethyl)-1-methyl-3-phenylurea present in the compositions as actually applied for destroying, preventing or controlling weeds will vary with the manner of application, the particular weeds for which control is sought, the purposes for which the application is being made, and like variables. In general, the herbicidal compositions as applied in the form of a spray or a dust will contain from about 0.5% to 85% by weight of 1-(2-hydroxyethyl)-1-methyl-3-phenylurea.

Fertilizer materials, other herbicidal agents, and other pest control agents such as insecticides and fungicides can be included in the herbicidal compositions of the invention if desired.

In order that the invention may be better understood, the following examples are given in addition to the examples already given above. The examples illustrate the preparation of 1-(2-hydroxyethyl)-1-methyl-3-phenylurea, herbicidal formulations employing the compound, herbicidal applications, and the results obtained. Parts are by weight unless otherwise specified and the numbers following tabulated ingredients in the examples represent parts by weight of the ingredients in the combination shown in such tabulation.

*Example 1*

To a solution of 47.6 parts of phenylisocyanate in 400 parts of xylene there is added slowly 30.0 parts of methylethanolamine over a one hour period. This mixture is heated with stirring to reflux temperature. The hot solution is treated with activated carbon, filtered and the filtrate allowed to cool. The product which crystallized from the solution is filtered and washed with n-pentane. A total of 64.0 parts of white crystalline material, M.P. 101–104.5° C., is obtained on drying in air. Recrystallization from 200 parts of benzene yields 54.8 parts of essentially pure 1-(2-hydroxyethyl)-1-methyl-3-phenylurea, M.P. 105–106° C. The compound is soluble in water to the extent of about 18 grams per liter at 25° C. It has a solubility of more than 10 grams per 100 milliliters at 25° C. in acetone, ethyl ether, chloroform and dimethyl formamide; and a solubility less than 10 grams per 100 milliliters at 25° C. in dioxane and ethyl ether.

*Analysis.*—Calcd. for $C_{10}H_{14}N_2O_2$: N, 14.43%. Found: N, 14.50%.

To test the herbicidal activity of this compound, it is applied as a 1% spray onto tomato plants. It is found that this treatment gives complete kill of the plants, thereby indicating a high degree of foliar activity on broadleaf weeds. To further test the herbicidal activity of this compound it is applied as a pre-emergence herbicide at the rate of five and ten pounds per acre onto plots seeded with broadleaf and grassy plants. It is found that substantially complete weed control is obtained by these treatments, thereby indicating that this compound also possesses a high order or pre-emergence activity.

*Example 2*

1-(2-hydroxyethyl)-1-methyl-3-phenylurea is formulated to provide a water dispersible powder adapted for dispersion in water for application as a herbicidal spray. The water dispersible powder compositon is made by intimately mixing the ingredients listed below using conventional mixing or blending equipment and then grinding the mixture to give a powder having an average particle size less than 50 microns.

| | |
|---|---|
| 1-(2-hydroxyethyl)-1-methyl-3-phenylurea | 75 |
| Fuller's earth | 23.75 |
| Sodium lauryl sulfate, 50% (wetting agent) | 1 |
| Methyl cellulose, 15 cps. (dispersing agent) | 0.25 |
| | 100 |

The water dispersible powdered composition described above is dispersed in water to give an aqueous spray composition containing one pound of 1-(2-hydroxethyl)-1-methyl-3-phenylurea for each 40 gallons of water. This aqueous spray composition is applied at a dosage of two pounds of 1-(2-hydroxyethyl)-1-methyl-3-phenylurea per acre to an area planted with cotton seed, the spray application being made prior to emergence of the cotton plant seedlings. Almost complete prevention of weed growth is obtained and the cotton plants average 70% more in weight six weeks after the treatment than do cotton plants grown in a control area which have not been treated with 1-(2-hydroxyethyl)-1-methyl-3-phenylurea.

*Example 3*

1-(2-hydroxyethyl)-1-methyl-3-phenylurea prepared as in Example 1 is formulated in a dust composition adapted for direct application as a dust. The dust is made by blending or mixing the ingredients shown below and grinding the mix to give a composition having an average particle size less than about 50 microns.

| | |
|---|---|
| 1-(2-hydroxethyl)-1-methyl-3-phenylurea | 20 |
| Talc | 80 |
| | 100 |

The dust formulation of this example is applied using conventional dusting apparatus at a dosage of 20 pounds per acre to kill and prevent regrowth for an extended period of both broadleaf and grassy weeds including such plants as plantain, Johnson grass, crabgrass, pigweed and other common unwanted plants.

*Example 4*

1-(2-hydroxyethyl)-1-methyl-3-phenylurea prepared as above is formulated in a powdered herbicidal concentrate adapted for use in the preparation of a spray using either an oil, water, or a combination of oil and water as a liquid diluent. The powdered concentrate is made by conventional mixing and grinding operations using the materials shown below in the weight proportions indicated.

| | |
|---|---|
| 1-(2-hydroxyethyl)-1-methyl-3-phenlyurea | 70 |
| Alkylated aryl polyether alcohol (wetting and dispersing agent) | 4 |
| Fuller's earth | 26 |
| | 100 |

The herbicidal concentrate of this example is dispersed in alkylated napththalene in the proportions of 5 pounds of the concentrate for each 50 gallons of the alkylated napthalene oil. The resulting oil dispersion is applied to a drainage ditch at a dosage of 25 gallons of the spray composition per 1,000 square feet of area treated to kill and prevent regrowth for an extended period of aquatic weeds in the ditch and weeds and grasses on the banks of the ditch.

*Example 5*

1-(2-hydroxyethyl)-1-methyl-3-phenylurea prepared as above is formulated in the emulsifiable oil composition shown below by thoroughly mixing and dispersing the compound and the conditioning agents in the organic diluent.

| | |
|---|---|
| 1-(2-hydroxyethyl)-1-methyl-3-phenylurea | 25 |
| Long chain fatty alcohol sulfate (emulsifying agent) | 2 |
| Goulac (dispersing agent) | 3 |
| Kerosene | 70 |
| | 100 |

The emulsifiable oil formulation described above is dispersed in water in the proportions of one quart of the composition for each 100 gallons of water. The resulting aqueous emulsion is sprayed over the track area of a railroad siding to provide an application of about 100 pounds of the 1-(2-hydroxyethyl)-1-methyl-3-phenylurea for each acre of siding area treated. This application effects substantially complete kill of weeds in the treated area and maintains the area free of weeds for an extended period.

*Example 6*

1-(2-hydroxyethyl)-1-methyl-3-phenylurea is formulated in the form of pellets by intimately blending it with the several conditioning agents shown in the tabulation below in the weight proportions there shown, then adding water to form a thick paste, feeding the paste through a pellet extruder, and drying.

| | |
|---|---|
| 1-(2-hydroxyethyl)-1-methyl-3-phenylurea | 10 |
| Sodium sulfate | 10 |
| Sodium salt of isopropyl naphthalene sulfonate (wetting agent) | 1 |
| Bentonite | 79 |
| | 100 |

The pellet formulation of this example is adapted for dispersion on contact with water. It is applied to water in amount sufficient to give a concentration of 10 p.p.m. of 1-(2-hydroxyethyl)-1-methyl-3-phenylurea in ponds to give control of submerged pond weeds such as American pond weed, Sago pond weed, and Richardson's pond weed.

While the invention has been described with particular reference to specific embodiments, it will be appreciated that no unnecessary limitations are to be understood therefrom. The invention is not limited to the exact details shown and described for obvious modifications will occur to those skilled in the art.

This application is a continuation-in-part of my copending application Serial No. 505,533, filed May 2, 1955, and now abandoned.

I claim:
1. As a novel compound, 1-(2-hydroxyethyl)-1-methyl-3-phenylurea.
2. In a method for treating soil with a herbicidal compound whereby extremely prolonged sterility of the treated soil is avoided, the improvement comprising applying to said soil 1-(2-hydroxyethyl)-1-methyl-3-phenylurea.

References Cited in the file of this patent

UNITED STATES PATENTS

| | | |
|---|---|---|
| 2,339,621 | D'Alelio | Jan. 18, 1944 |
| 2,342,785 | Bock et al. | Feb. 29, 1944 |
| 2,655,447 | Todd | Oct. 13, 1953 |
| 2,663,729 | Searle et al. | Dec. 22, 1953 |
| 2,723,192 | Todd | Nov. 8, 1955 |

OTHER REFERENCES

Bougalt et al.: J. Pharm. et de Chem. [8th Series], vol. 17, pp. 193–5 (1933).

Chemical Abstracts (Thompson et al.), vol. 41, p. 3911 (1947).

Chemical Abstracts, vol. 49, p. 6837 (1955).

Dains et al.: J. Am. Chem. Soc., vol. 47, pp. 1981–1989 (1925).